(12) United States Patent
Rueb

(10) Patent No.: US 10,157,458 B2
(45) Date of Patent: *Dec. 18, 2018

(54) LASER PROJECTION SYSTEM AND METHOD

(71) Applicant: Virtek Vision International ULC, Waterloo (CA)

(72) Inventor: Kurt D. Rueb, Kitchner (CA)

(73) Assignee: Virtek Vision International, ULC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,331

(22) Filed: Feb. 14, 2017

(65) Prior Publication Data

US 2017/0161889 A1 Jun. 8, 2017

Related U.S. Application Data

(63) Continuation of application No. 14/954,117, filed on Nov. 30, 2015, now abandoned, and a continuation of
(Continued)

(51) Int. Cl.
*H04N 9/47* (2006.01)
*G06T 7/00* (2017.01)
(Continued)

(52) U.S. Cl.
CPC ........ *G06T 7/0006* (2013.01); *B23Q 17/2423* (2013.01); *G01B 11/002* (2013.01);
(Continued)

(58) Field of Classification Search
CPC ......... G01C 11/00; G01C 11/02; G01C 11/06; G01C 15/04; G01C 21/3691;
(Continued)

(56) References Cited

U.S. PATENT DOCUMENTS 6,547,397 B1 * 4/2003 Kaufman ............. G01B 11/002
353/122
6,590,669 B1 7/2003 Wagner
(Continued)

FOREIGN PATENT DOCUMENTS

CN 102288131 A 12/2011
CN 102365522 A 2/2012

OTHER PUBLICATIONS

EP 13153808 Search Report dated Mar. 3, 2017.
(Continued)

*Primary Examiner* — Frederick D Bailey
*Assistant Examiner* — Masum Billah
(74) *Attorney, Agent, or Firm* — Miller Canfield

(57) ABSTRACT

A laser projection system for projecting an image on a workpiece includes a photogrammetry assembly and a laser projector, each communicating with a computer. The photogrammetry assembly includes a first camera for scanning the workpiece, and the laser projector projects a laser image to arbitrary locations. Light is conveyed from the direction of the workpiece to the photogrammetry assembly. The photogrammetry assembly signals the coordinates light conveyed toward the photogrammetry assembly to the computer with the computer being programmable for determining a geometric location of the laser image. The computer establishes a geometric correlation between the photogrammetry assembly, the laser projector, and the workpiece for realigning the laser image to a corrected geometric location relative to the workpiece.

6 Claims, 4 Drawing Sheets

Related U.S. Application Data application No. 13/652,735, filed on Oct. 16, 2012, now Pat. No. 9,200,899.

(60) Provisional application No. 61/614,252, filed on Mar. 22, 2012.

(51) Int. Cl.
| | |
|---|---|
| *G01C 11/00* | (2006.01) |
| *G01C 15/00* | (2006.01) |
| *G01C 11/02* | (2006.01) |
| *H04N 5/225* | (2006.01) |
| *H04N 9/31* | (2006.01) |
| *G01B 11/00* | (2006.01) |
| *G01B 11/25* | (2006.01) |
| *G06T 7/194* | (2017.01) |
| *G06T 7/73* | (2017.01) |
| *G06T 7/11* | (2017.01) |
| *H04N 13/254* | (2018.01) |
| *B23Q 17/24* | (2006.01) |
| *G01C 11/08* | (2006.01) |
| *H04N 13/239* | (2018.01) |

(52) U.S. Cl.
CPC ........ *G01B 11/005* (2013.01); *G01B 11/2545* (2013.01); *G01C 11/00* (2013.01); *G01C 11/02* (2013.01); *G01C 11/025* (2013.01); *G01C 11/08* (2013.01); *G01C 15/002* (2013.01); *G06T 7/001* (2013.01); *G06T 7/11* (2017.01); *G06T 7/194* (2017.01); *G06T 7/74* (2017.01); *H04N 5/225* (2013.01); *H04N 9/3129* (2013.01); *H04N 13/239* (2018.05); *H04N 13/254* (2018.05); *G06T 2207/10012* (2013.01); *G06T 2207/10028* (2013.01); *G06T 2207/20224* (2013.01); *G06T 2207/30164* (2013.01); *G06T 2207/30204* (2013.01)

(58) Field of Classification Search
CPC .. G01C 21/3697; H04N 9/3155; H04N 9/317; H04N 13/239; G01B 11/002
USPC ......................................................... 348/94
See application file for complete search history.

(56) References Cited

U.S. PATENT DOCUMENTS

| | | | |
|---|---|---|---|
| 2005/0058332 A1 | 3/2005 | Kaufman et al. | |
| 2005/0121422 A1* | 6/2005 | Morden .................. | B25H 7/00 219/121.6 |
| 2006/0033713 A1* | 2/2006 | Pryor ..................... | G06F 3/042 345/158 |
| 2006/0038188 A1* | 2/2006 | Erchak ................... | H01L 33/20 257/82 |
| 2007/0262065 A1* | 11/2007 | Peters .................... | B23K 9/092 219/130.5 |
| 2008/0246943 A1 | 10/2008 | Kaufman et al. | |
| 2011/0059798 A1 | 3/2011 | Pryor | |
| 2012/0050528 A1 | 3/2012 | Davies et al. | |
| 2012/0057174 A1 | 3/2012 | Briggs | |

OTHER PUBLICATIONS

CN 2013-10092944.1 First Office Action and Search Report dated Oct. 19, 2016.
English Abstract and machine translation of CN102365522.
Machine translation of CN102288131.
Notification of First Office Action and Chinese Search Report dated Oct. 19, 2016.
Partial European Search Report dated Oct. 21 2016.

* cited by examiner

LASER PROJECTION SYSTEM AND METHOD

PRIOR APPLICATION

This application claims priority to U.S. patent application Ser. No. 14/954,117 filed on Nov. 30, 2015, which is a continuation of U.S. patent application Ser. No. 13/652,735 filed on Oct. 16, 2012, now U.S. Pat. No. 9,200,899 issued on Dec. 1, 2015 and U.S. Provisional Patent Application No. 61/614,252 filed on Mar. 22, 2012.

FIELD OF USE

This application relates generally to a laser projection system for use in an industrial environment. More specifically, this application relates to projecting a laser template on a workpiece with the assistance of a photogrammetry assembly.

BACKGROUND

Photogrammetry processes and assemblies have been used to identify locations of objects in various settings. In some instances, photogrammetry has been found useful in the manufacture of semiconductors for use in computer-based objects. However, photogrammetry has not proven useful in the manufacture of large scale objects in a mass production setting.

Alternatively, laser projectors have been used to project assembly templates on objects as an assembly aid in the manufacture of mass production products. However, projecting templates has also not been useful on a mass production scale where various workpieces are being produced and limited opportunity exists to project a geometrically accurate projection image. Therefore, manufactures of original equipment continue to use physical, and in some instances, steel templates to direct work performed on workpieces.

Therefore, a need exists to enhance both the ability to locate an object in a precise geometrical relationship to a laser projector to accurately project a template for use as an assembly aid.

SUMMARY

A laser projection system and method for projecting an image on a workpiece includes the use of a photogrammetry assembly and a laser projector each communicating with a computer. The photogrammetry assembly includes a first camera for scanning the workpiece. The laser projector projects a laser image to arbitrary locations with the laser image being readable by the camera. The photogrammetry assembly signals the coordinates of the work piece to the computer by scanning light conveyed from the direction of the workpiece. The computer is programmable for determining a geometric location of the workpiece from the light conveyed from the direction of the workpiece. The computer establishes geometric correlation between the photogrammetry assembly, the laser projector, and the workpiece and signals the laser projector to project a template onto a geometric desirable location of the workpiece.

For the first time, a low cost method of generating a laser template onto the workpiece has been achieved. The use of a photogrammetry system to assist locating a laser projected template within a geometric coordinate system in an industrial setting reduces cost while increasing the quality and dimensional accuracy of work performed on a workpiece. Where affixing a physical template to the workpiece only provides general dimensional accuracy, the subject method of projecting a laser image or template with the assistance of a photogrammetry device provides a manufacturing tolerance of less than one millimeter.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION

Figure 1:
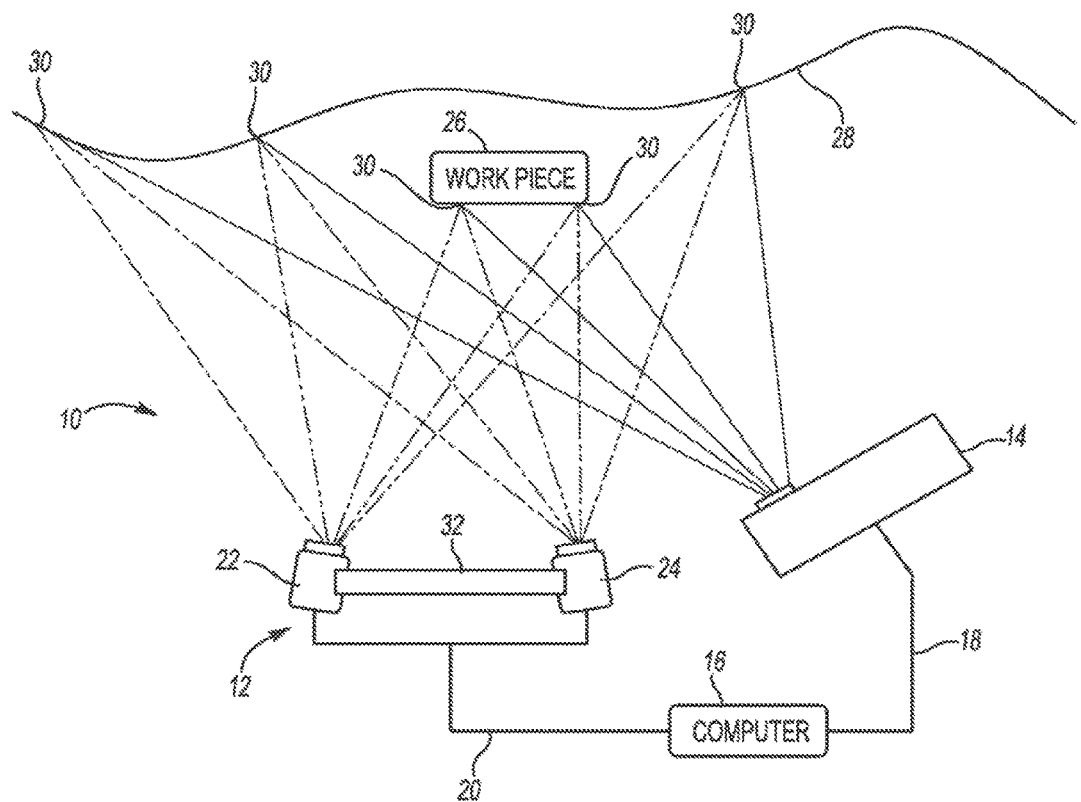
FIG. 1 shows a first embodiment of the laser projection system of the present invention.

A laser projection system for projecting an image on a workpiece is generally shown at 10 of FIG. 1. The laser projection system includes a photogrammetry assembly 12 and a laser projector 14, each of which communicates via a computer 16. The computer 16 communicates with the laser projector 14 by way of electrical circuit 18 and with the photogrammetry assembly 12 by way of electrical circuit 20. Although the electrical circuits 18, 20 are represented as hard wires in this embodiment, it should be understood by those of skill in the art that radio frequency or equivalent transmission between the computer 16, the photogrammetry assembly 12 and the laser projector 14 is within the scope of this invention.

The photogrammetry assembly includes a first camera, 22 and, in this embodiment, a second camera 24. It is contemplated by the inventor that alternative embodiments may make use of only a first camera 22 as will be explained further below. One type of camera contemplated by the inventors is an industrial camera model acA2500-14GM manufactured by Basler AG. However, other industrial type cameras having equivalent functionality is suitable for use with the inventive projection system 10.

The photogrammetry assembly 12 is adapted to scan and take an image of a workpiece 26 and a surrounding environment 28 for the purpose of locating the workpiece 26 in a three-dimensional coordinate system.

The laser projector 14 projects a laser image to arbitrary locations 30 with at least some of the laser image being projected onto the workpiece 26. The laser image takes the form of a plurality of laser beams, laser patterns, or manufacturing template, or combinations thereof.

The laser image generated by the laser projector 14 is readable by the photogrammetry assembly 12. More specifically, the laser image is readable by the first and second camera 22, 24. The first and second cameras 22, 24 are separated a known distance by a spacer bar 32 manufactured from the material not subject to dimensional variations due to temperature fluctuations. In one embodiment, the spacer bar 32 is manufactured from a uni-directional carbon fiber to provide temperature resistance to dimensional variation.

The first and second cameras 22, 24 identify the arbitrary locations 30 onto which the laser image is projected by the laser projector 14 by triangulating the image and signaling the computer 16 to calculate where the arbitrary locations 30 are located in a three-dimensional coordinate system.

The computer 16 is programmed to calculate the geometric correlation between the photogrammetry assembly 12, the laser projector 14 and the workpiece 26 by way of a signal transmitted from the cameras 22, 24 of the scanned arbitrary locations 30 onto which the laser image is projected. Additional accuracy is achievable by manipulating the laser projector 14 to project a laser image onto the various features such as, for example, corners or apertures defined by the workpiece 26 and scanning the laser image as set forth above. Once the computer 16 establishes a geometric correlation between the photogrammetry assembly 12 the laser projector 14 and the workpiece 26, the laser image is corrected to a geometric location relative to the workpiece 26 and is used as a template for an assembly aid to perform work on the workpiece 26. For example, the laser template identifies the location of a weld operation, a machine operation, or other work intended to be performed on the workpiece 26.

Once the laser template has been projected onto a desired location upon the workpiece 26, the computer 16 periodically prompts the projector 14 to project a laser image to arbitrary locations 30 from which the photogrammetry assembly 12 scans and signals the computer 16 to calculate the geometric correlation between the photogrammetry assembly 12, the laser projector 14, and the workpiece 26 to verify none of these items have been moved, there has been no drift of the image, and that the laser template is projected in the correct geometric location on the workpiece 26. In this manner, the accuracy of the laser projection of the template is repeatedly updated during the manufacturing operation.

Figure 2A:
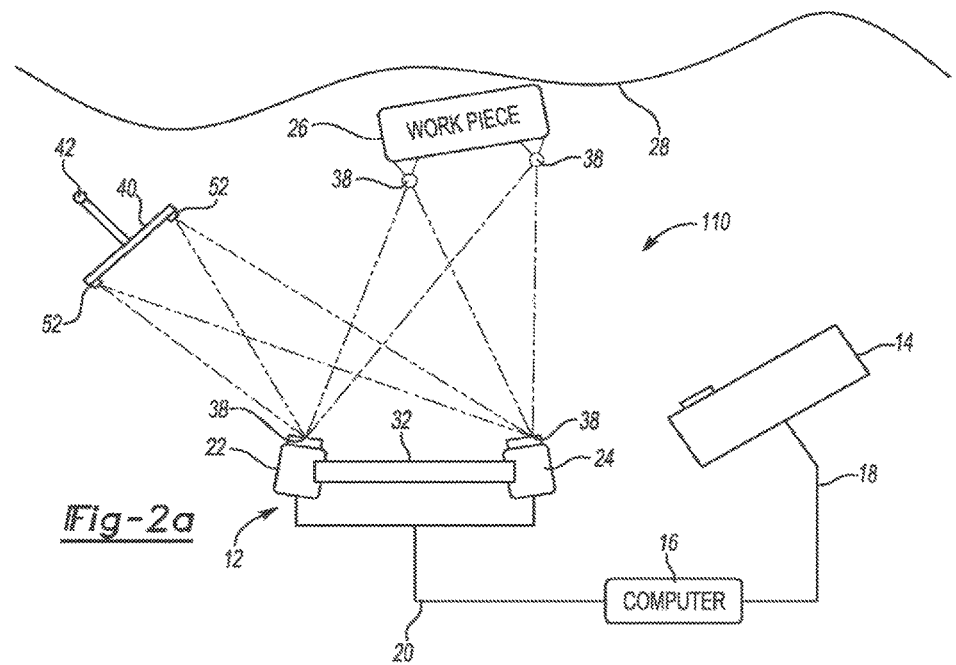
FIGS. 2a and 2b show an alternative embodiment of the laser projection system of the present invention.
Figure 2B:
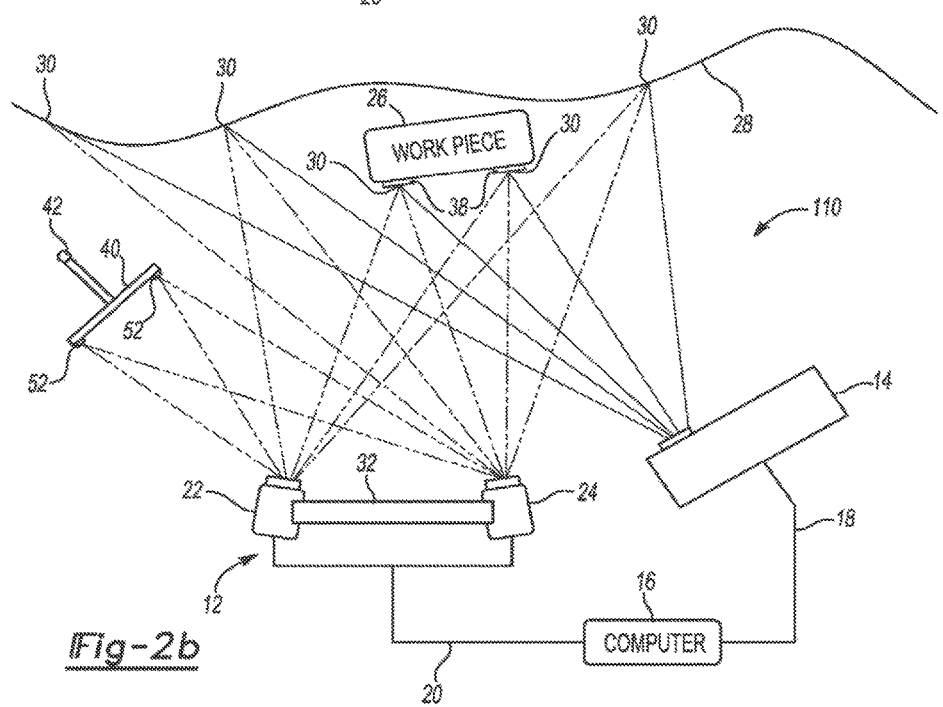
Figure 4:
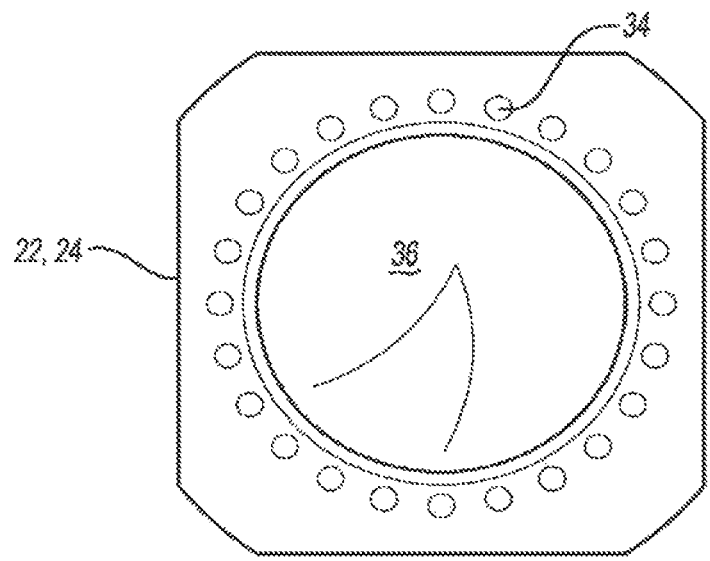
FIG. 4 shows a lens view of a camera associated with a photogrammetry assembly associated with the laser projection system.

An alternate embodiment of the present invention, wherein like elements include like element numbers, is generally shown at 110 of FIGS. 2a and 2b. In this embodiment, the photogrammetry assembly 12 includes a light source 34 (FIG. 4) transmitting light that is readable by the photogrammetry assembly 12 separate from the laser image. However, it is contemplated by the inventor that the light source 34 transmits light in a similar wave-length range as that of the laser projector 14. More specifically, it is contemplated that green light having a wave length range between 540 and 520 nanometers is transmitted by both the light source 34 and the laser projector 14. It is further contemplated by the inventor that the light source 34 includes a plurality of light emitting diode spaced around each camera lens 36 of the first and second cameras 22, 24 as best represented in FIG. 4. However, it should be understood by those of ordinary skill in the art that the light source 34 can be separate from the photogrammetry assembly 12 as will be explained further below.

Referring again to FIGS. 2a and 2b, the light source 34 transmit light toward the workpiece 26 onto which reflective targets 38 are temporarily affixed. The reflective targets 38 are contemplated to be retroreflective targets for reflecting light back toward the photogrammetry assembly 12 into the camera lens 36 of the first and second cameras 22, 24 so that the photogrammetry assembly 12 signal the computer 16 the location of the reflective targets 38 allowing the computer 16 to calculate the precise location of the workpiece 26 in a geometric coordinate system. In this embodiment, the inventor contemplates the reflective targets 38 be encoded to enable a computer to identify which reflective targets 38 are signaling the photogrammetry assembly 12. For example, one method of encoding the reflective targets 38 is by way of two reflective elements disposed upon individual reflective targets 38 and spaced a known distance enabling the computer 6 to read two reflective images spaced a known distance from an individual reflective target 38. It is also believed that encoding the reflective targets 38 reduces the probability of the photogrammetry assembly 12 reading reflections from the environment 28 in error rendering an incorrect calculation of the location of the workpiece 26 in the coordinate system. The step of emitting light toward the workpiece includes scanning a space in which the workpiece is located for establishing a background image and then optically detecting the location of the plurality of retroreflective targets including subtracting the background image from light reflected by the plurality of retroreflective targets.

The light source 34 periodically emits light contemplated to be in the form of a flash so that the computer 16 can continuously calculate the location of the workpiece 26 within the geometric coordinate system. Once the workpiece 26 is established within a geometric coordinate system, the laser projector 14 projects a laser image to arbitrary locations as set forth in the previous embodiment. Therefore, the photogrammetry assembly 12 scans both light reflected from the reflective targets 38 and the laser image projected on arbitrary locations 30 by the laser projector 14 to accurately determine spatial relationship within a geometric coordinate system of the photogrammetry assembly 12, the laser projector 14, and the workpiece 26. It should be understood by those of skill in the art that the light source 34 can also transmit light from the location of the reflective targets 38 are affixed. In this manner, light emitting diodes 34 would replace the reflective targets 38 and transmit light directly to the photogrammetry assembly 12. It should be understood that when the term reflect or reflector is used transmitting light as described above is also included so that light is conveyed from the direction of the workpiece.

Figure 3:
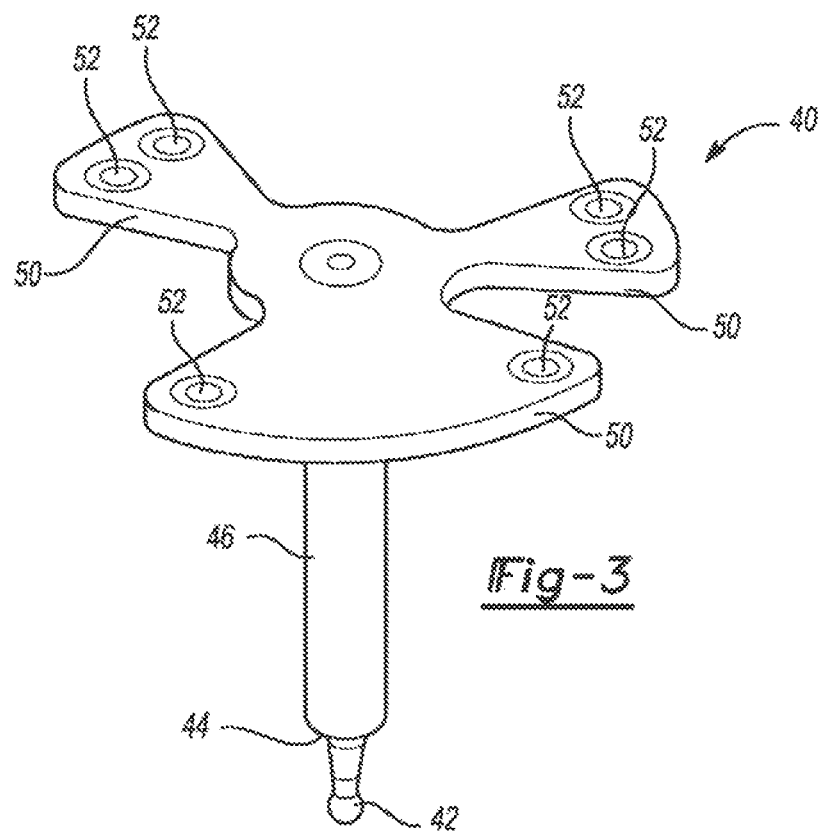
FIG. 3 shows a reflective probe for use with the second embodiment.

Included in this embodiment is a probe 40 best represented in FIG. 3. The probe 40 includes a contact element 42 disposed upon a distal end 44 of a shaft 46. The reflective target 48 is disposed on an opposite end of the shaft 46 from a contact element 42. The reflective target 48 is contemplated to include a plurality of arms 50 each having encoded reflectors 52. The use of four reflectors 52 has proven to improve the accuracy of the measurements of the geometrically relevant features on the workpiece, particularly when the reflectors 52 are spaced from an axis of the probe defined by the contact element 42. The reflectors 52 are encoded by locating a plurality of reflectors 52 on each arm 50 spaced by a known distance. However, alternative methods of encoding may also be used such as, for example, altering the reflectivity of an individual reflector 52. By encoding the reflectors 52, the photogrammetry assembly 12 is able to determine which specific probe 48 is reflecting light from the light source 34 to the photogrammetry assembly 12. Encoding is desirable when a plurality of probes 40 are used to identify various features on the workpiece 26 as will be explained further below.

Referring again to FIGS. 2a and 2b, the probe 40 is shown reflecting light received from the light source 34 to the first and second camera 22, 24, allowing the computer 16 to determine the location of the probe 40 in the geometric coordinate system in which the workpiece 26 exists. The contact element 42 of the probe 40 is manually touched to a particular feature on the workpiece 26. This approach streamlines the determination of the important features or datums on the workpiece necessary for performing work on the workpiece in a dimensionally accurate manner, and reduces the time required to project the laser template onto the workpiece. For example, the contact element 42 is touched to an edge of an aperture (not shown) that is a datum from which a work location must be accurately correlated. Once the computer 16 calculates the location of the probe 40, the laser projector 14 transmits a laser image in the form of a template further increasing the accuracy of the location of the laser image on the workpiece 26. The contact element 42 is touched to various edges or contours of a specific element to further define the location of the element by way of the probe 40 again enhancing the accuracy of the template projected on the workpiece 26 by the laser projector 14. Alternatively, the contact element 42 includes different shapes and sizes mirroring the various features of the workpiece 26 requiring location identification inside the coordinate system.

Figure 5A:
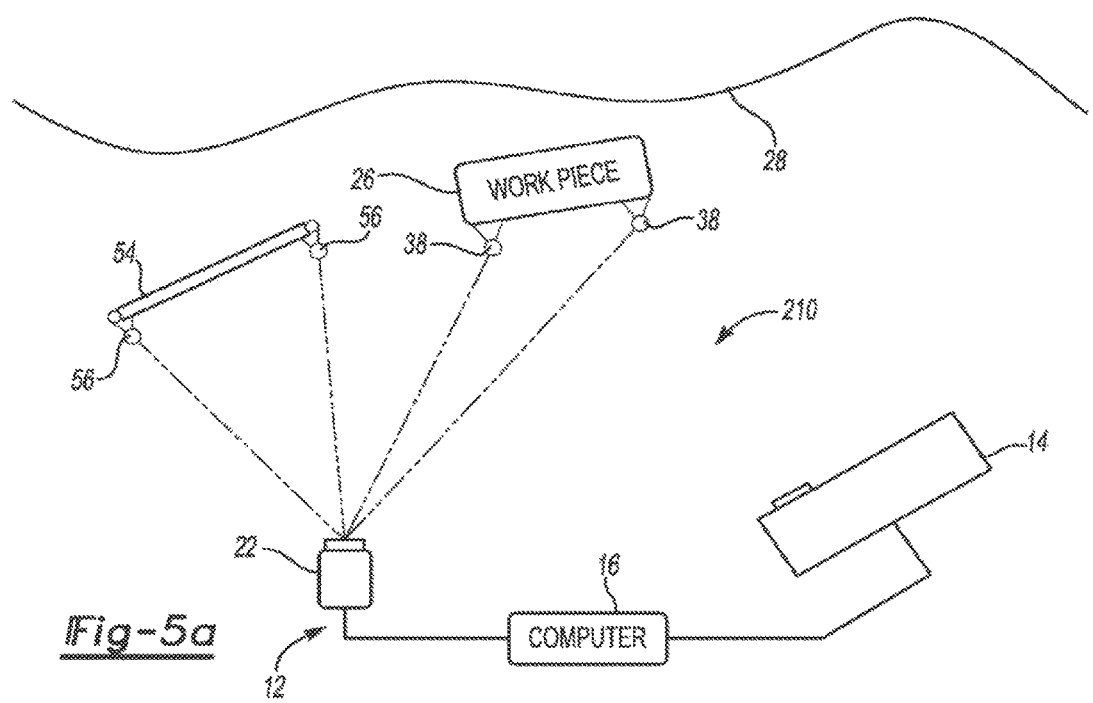
FIGS. 5a and 5b show an alternative embodiment of the laser projection system of the present invention.
Figure 5B:
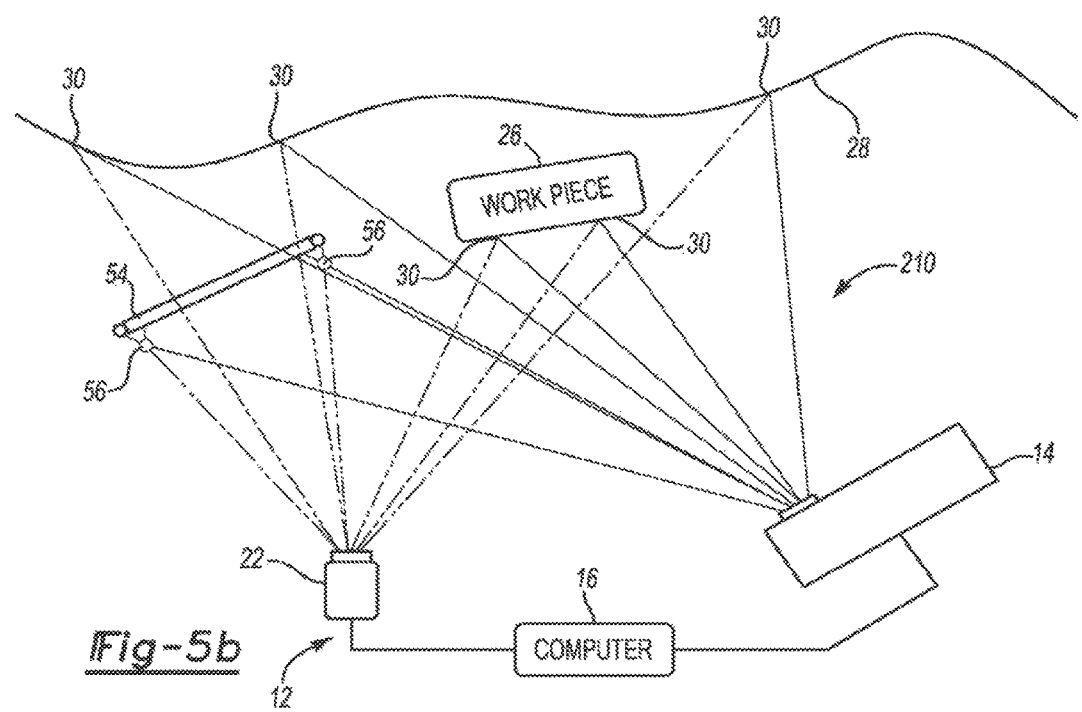

A still further embodiment of the projection system is generally shown at 210 of FIGS. 5*a* and 5*b*. In this embodiment, the photogrammetry assembly 12 makes use of a single camera 22 and communicates with the laser projector 14 and the computer 16 as explained above. Because a single camera 22 is used to scan the workpiece 26, it is desirable to establish a geometric scale of the relative position of the workpiece 26. As such, a scale bar 54 having scale reflective targets 56 spaced a known distance on a scale bar 54. Through triangulation with the spaced scale reflective targets 56 and the camera 22, the computer 16 is able to establish a geometric scale of the workpiece 26 in a geometric coordinate system. As set forth above, the workpiece surface is identified by temporarily affixing reflective targets 38 which are encoded. The light source 34 transmits light to the reflective targets 38 and to the scale reflective targets 56 and the photogrammetry assembly scans the reflective image to signal the computer 16 the coordinates of the workpiece 26, allowing the computer 16 to correlate the photogrammetry assembly 12, the laser projector 14, and the workpiece 26 in a geometric coordinate system. This allows the laser projector 14 to project a laser template upon the workpiece 26 as set forth above. It should be understood to those of skill in the art that the probe 40 may also be used in combination with the scale bar 54 and scale reflective targets 56 to accurately determine precise location of various features of the workpiece 26.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

The invention claimed is:

1. A method for projecting an image onto a workpiece comprising:
   providing a laser projector configured to project a laser image onto the workpiece and an optical sensor assembly for detecting light reflected from the direction of the workpiece;
   periodically emitting light toward the workpiece for detection by said optical sensor assembly;
   using the optical sensor assembly for optically detecting the location of a plurality of reference targets disposed upon the workpiece by detecting light emitted toward the workpiece that is reflected from the reference targets toward the optical sensor including scanning a space comprising the workpiece establishing a background image and subtracting the background image from light reflected by the plurality of retroreflective targets;
   calculating the location of the workpiece within a geometric coordinate system based on the location of the plurality of reference targets;
   causing the laser projector to project a template onto a desired geometric location of the workpiece for a manufacturing operation based upon the calculated location of the workpiece;
   monitoring for relative movement between the workpiece, the laser projector, and the optical sensor assembly by repeatedly updating the calculation of the workpiece within the geometric coordinate system based upon the location of the plurality of reference targets disposed upon the workpiece as determined by light reflected from the reference targets toward the optical sensor assembly; and
   correcting the template being projected onto the workpiece based upon movement of the workpiece.

2. The method set forth in claim 1 further including determining a geometric correlation between the optical sensor assembly and the laser projector.

3. The method set forth in claim 1 wherein the geometric coordinate system is a three-dimensional coordinate system.

4. The method set forth in claim 1 wherein the optical sensor assembly includes a photogrammetry assembly comprising first and second cameras that are spaced apart from each other by a fixed distance.

5. The method set forth in claim 1 wherein the emitted light includes a wavelength of between 520 nm and 540 nm.

6. The method set forth in claim 1 wherein the template is a manufacturing template for performing a weld operation or a machine operation on the workpiece.

\* \* \* \* \*